(12) United States Patent
AlSaud et al.

(10) Patent No.: US 10,572,796 B2
(45) Date of Patent: Feb. 25, 2020

(54) AUTOMATED SAFETY KPI ENHANCEMENT

(71) Applicant: Saudi Arabian Oil Company, Dhahran (SA)

(72) Inventors: Zakarya Abu AlSaud, Saihat (SA); Fouad Alkhabbaz, Qatif (SA); Soloman M. Almadi, Dhahran (SA); Abduladhim Abdullatif, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 651 days.

(21) Appl. No.: 14/705,650

(22) Filed: May 6, 2015

(65) Prior Publication Data

US 2016/0328641 A1 Nov. 10, 2016

(51) Int. Cl.
*G06Q 10/06* (2012.01)
*G06Q 10/00* (2012.01)
*G06Q 40/00* (2012.01)
*G06F 17/30* (2006.01)
*G06N 3/04* (2006.01)
*G06Q 10/04* (2012.01)
*G06N 3/08* (2006.01)

(52) U.S. Cl.
CPC .......... *G06N 3/0436* (2013.01); *G06N 3/04* (2013.01); *G06N 3/08* (2013.01); *G06Q 10/04* (2013.01); *G06Q 10/06393* (2013.01)

(58) Field of Classification Search
CPC ........ G05B 2219/34413; G06N 3/0436; G06F 17/30; G06F 17/60
See application file for complete search history.

(56) References Cited

U.S. PATENT DOCUMENTS 5,164,897 A * 11/1992 Clark ................. G06Q 10/1053
705/321
7,933,989 B1 4/2011 Barker et al.
(Continued)

FOREIGN PATENT DOCUMENTS

JP H07152789 6/1995

OTHER PUBLICATIONS

'Reducing Business Surprises through Proactive, Real-Time Sensing and Alert Management': Cohen, 2005, EESR Workshop on End-to-End, Sense-and-Respond Systems, Applications, and Services.*

(Continued)

*Primary Examiner* — Li B. Zhen
*Assistant Examiner* — Peter D Coughlan
(74) *Attorney, Agent, or Firm* — Fish & Richardson P.C.

(57) ABSTRACT

The present disclosure describes methods and systems, including computer-implemented methods, computer-program products, and computer systems, for automating a proactive Safety KPI analysis. Correlated data related to a safety key performance indicator (KPI) is obtained from a correlation engine. A safety KPI prediction related to safety incidents, future safety trends, or future safety KPIs is generated based on the received correlated data and at least one safety KPI prediction model. The generated safety KPI prediction is transmitted to a proactive monitoring and alerting engine and a safety KPI alert is generated based on the safety KPI prediction, at least one alert threshold, and the at least one safety KPI prediction model. Transmission of the generated safety KPI alert is then initiated.

21 Claims, 4 Drawing Sheets

(56) References Cited

U.S. PATENT DOCUMENTS

| | | | |
|---|---|---|---|
| 8,667,091 B2* | 3/2014 | Almadi | H04L 41/069 709/219 |
| 8,732,106 B1 | 5/2014 | Presgraves et al. | |
| 8,884,759 B2 | 11/2014 | Oktem et al. | |
| 2006/0085174 A1* | 4/2006 | Hemanthkumar | G06Q 10/04 703/10 |
| 2009/0012631 A1 | 1/2009 | Fuller | |
| 2009/0089108 A1 | 4/2009 | Angell et al. | |
| 2009/0210081 A1* | 8/2009 | Sustaeta | G05B 13/0285 700/99 |
| 2010/0228584 A1 | 9/2010 | Nash | |
| 2011/0066454 A1 | 3/2011 | Rosauer et al. | |
| 2011/0071963 A1 | 3/2011 | Piovesan et al. | |
| 2012/0059634 A1* | 3/2012 | Bouzarkouna | E21B 43/30 703/2 |
| 2012/0084400 A1 | 4/2012 | Almadi et al. | |
| 2013/0282641 A1* | 10/2013 | Martin | G06N 5/02 706/47 |
| 2014/0046863 A1 | 2/2014 | Gifford et al. | |
| 2014/0156584 A1 | 6/2014 | Motukuri et al. | |
| 2014/0310059 A1* | 10/2014 | Ellis | G06Q 10/04 705/7.31 |
| 2015/0074023 A1* | 3/2015 | Gu | G06N 3/08 706/12 |

OTHER PUBLICATIONS

'Intelligent Field Infrastructure Adoption: Approach and Best Practices': Almadi, 2012, SPE 150066.*

'Evaluating safety management and culture interventions to improve safety:Effective intervention strategies': Hale, 2010, Esevier, Safety Science.*

Hui et al., "Prediction of Safety Objective of an Enterprise using Fuzzy Neural Network", International Symposium on Safety Science and Engineering in China, published in 2012, Procedia Engineering, vol. 43, pp. 162-167.

International Search Report and Written Opinion of the International Searching Authority issued in International Application No. PCT/US2015/058221 dated Dec. 22, 2015; 11 pages.

Gulf Cooperation Council Examination Report issued in GC Application No. 2016-31049 dated Jul. 19, 2018, 3 pages.

Gulf Cooperation Council Examination Report issued in GC Application No. 2016-31049 dated Dec. 20, 2018, 6 pages.

Gulf Cooperation Council Examination Report issued in GC Application No. 2016-31049 dated Oct. 30, 2019, 4 pages.

* cited by examiner

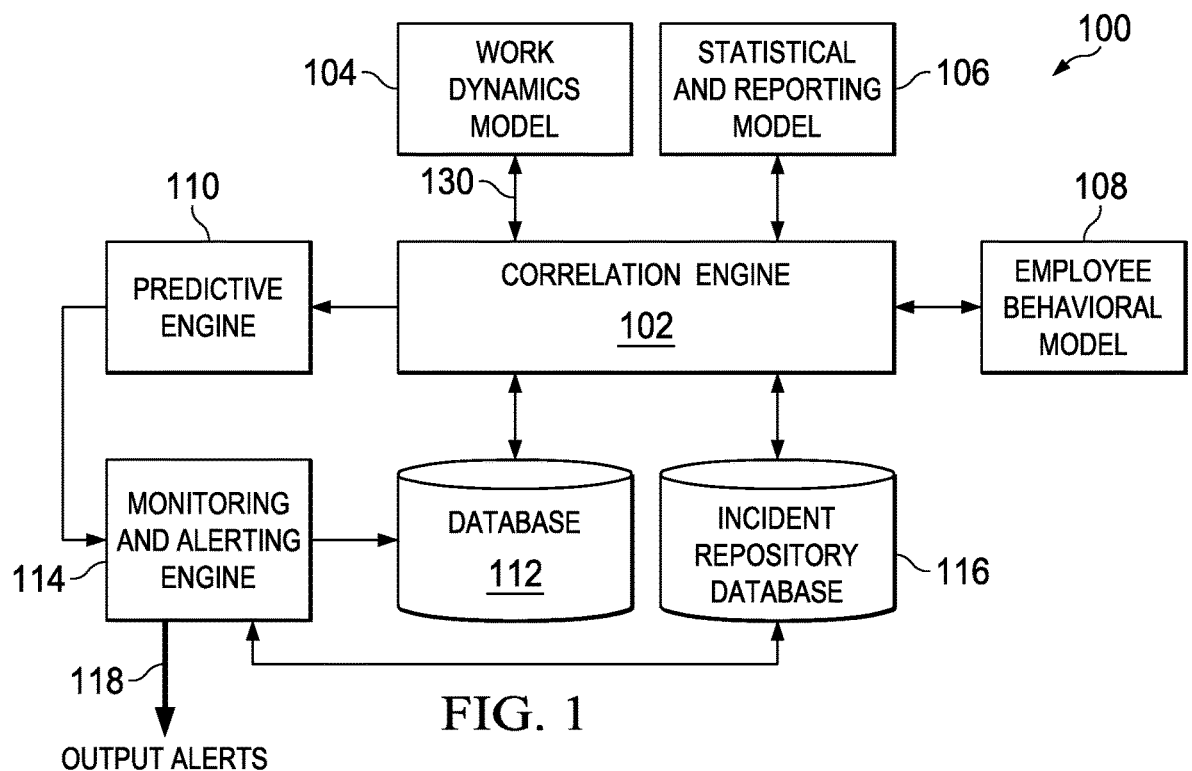

FIG. 1

$$\text{AVERAGE SAFETY KPI'S \%} = 100 - \left[ \sum_{d=0}^{n}(d)=\alpha - \sum_{r=0}^{m}(r)=\beta \right]$$

AVERAGE SAFETY KPI'S % = THE AVERAGE SCORE OF SAFETY KPI'S IN PERCENTAGES
$d$ = SAFETY DEVIATION
$n$ = MAXIMUM NUMBER OF DEVIATIONS
$\alpha$ = SEVERITY OF DEVIATION FACTOR CALCULATED ON A SCALE FROM 1 TO 10
$r$ = REMEDIATION PLANS FOR DEVIATIONS RECORDED
$m$ = MAXIMUM NUMBER OF REMEDIATION PLANS
$\beta$ = FACTOR BASED ON COST, TIME AND DIFFICULTY TO IMPLEMENT REMEDIATION
     $\beta$ = COST + TIME + DIFFICULTY

FIG. 2A

| TIME (EXAMPLE FIGURES) | FACTOR |
|---|---|
| SHORT TERM (3 MONTHS OR LESS) | 0.3 |
| MEDIUM TERM (6 MONTHS OR LESS) | 0.6 |
| LONG TERM (ONE YEAR OR MORE) | 1.0 |

| POTENTIAL LOSS (EXAMPLE FIGURES) | ALPHA |
|---|---|
| $1 M =< PL < $2 M | 1 |
| $2 M =< PL < $3 M | 2 |
| $3 M =< PL < $4 M | 3 |
| $4 M =< PL < $5 M | 4 |
| $5 M =< PL < $6 M | 5 |
| $6 M =< PL < $7 M | 6 |
| $7 M =< PL < $8 M | 7 |
| $8 M =< PL < $9 M | 8 |
| $9 M =< PL < $10 M | 9 |
| $10 M =< PL | 10 |

202b (top), 204b (bottom)

| COST (EXAMPLE FIGURES) | FACTOR |
|---|---|
| $1 M =< C < $2 M | 0.3 |
| $1 M =< C < $2 M | 0.6 |
| $2 M =< C < $3 M | 0.9 |
| $3 M =< C < $4 M | 1.2 |
| $4 M =< C < $5 M | 1.5 |
| $5 M =< C < $6 M | 1.8 |
| $6 M =< C < $7 M | 2.1 |
| $7 M =< C < $8 M | 2.4 |
| $8 M =< C < $9 M | 2.7 |
| $9 M =< C < $10 M | 1 |
| $10 M =< C | |

202c (top), 204c (bottom)

| DIFFICULTY (EXAMPLE FIGURES) | FACTOR |
|---|---|
| SMALL (MINOR CHANGE IN INFRASTRUCTURE) | 0.3 |
| MEDIUM (MEDIUM CHANGE IN INFRASTRUCTURE) | 0.6 |
| LARGE (RADICAL CHANGE IN INFRASTRUCTURE) | 1.0 |

202e (top), 204e (bottom)

FIG. 2E

AUTOMATED SAFETY KPI ENHANCEMENT

BACKGROUND

Safety Key Performance Indicators ("Safety KPIs") are determined metrics/values often used by entities (e.g., organizations, companies, groups, etc.) used as factors to quantify a safety posture of the entity and to monitor and manage safety policy compliance. In other words, a Safety KPI is a type of "scorecard" used to determine how well the entity is doing in comparison with desired goals. Typical cases, each department within a particular entity completes a survey one or more times each year to provide data necessary to calculate appropriate Safety KPIs. Typically, each department's survey is manually analyzed to produce Safety KPIs for the organization. In this manner, although inefficient and time consuming, departmental compliance with safety policies can be determined and historical safety trends can be identified.

SUMMARY

The present disclosure describes methods and systems, including computer-implemented methods, computer-program products, and computer systems for automating a proactive Safety KPI analysis. One computer-implemented method includes obtaining correlated data related to a safety key performance indicator (KPI) from a correlation engine; generating a safety KPI prediction related to safety incidents, future safety trends, or future safety KPIs based on the received correlated data and at least one safety KPI prediction model; transmitting the generated safety KPI prediction to a proactive monitoring and alerting engine; generating a safety KPI alert based on the safety KPI prediction, at least one alert threshold, and the at least one safety KPI prediction model; and initiating transmission of the generated safety KPI alert.

Other implementations of this aspect include corresponding computer systems, apparatuses, and computer programs recorded on one or more non-transitory computer-readable media/storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination: [TBD with approved method claims]

A first aspect, combinable with the general implementation, wherein the correlation engine is communicably coupled with at least one database and at least one correlation model selected from the group consisting of a Work Dynamics model, a Statistical and Reporting model, and an Employee Behavioral model.

A second aspect, combinable with any of the previous aspects, wherein the proactive monitoring and alerting engine can update an internal alert threshold based on data from the at least one database and the at least one correlation model.

A third aspect, combinable with the general implementation, wherein the generation is performed by at least one of a prediction engine selected from the group consisting of a neural network, fuzzy logic, probability logic, and an artificial intelligence engine.

A fourth aspect, combinable with any of the previous aspects, wherein the prediction engine is self-learning.

A fifth aspect, combinable with the general implementation, wherein the at least one safety KPI prediction model is generated or updated by the at least one prediction engine based on the received correlated data, the at least one safety KPI prediction model used by the proactive monitoring and alerting engine to generate the safety KPI alerts.

A sixth aspect, combinable with any of the previous aspects, wherein the proactive monitoring and alerting engine receives data from the at least one safety KPI prediction model.

The subject matter described in this specification can be implemented in particular implementations so as to realize one or more of the following advantages. First, root causes for some safety incidents can be understood and identified, and thus these potential safety incidents can be predicted and anticipated. Second, Safety KPI collection and/or analysis process can be automated, so that Safety KPIs are always optimized, available, and updated for use. Third, manual safety reporting can be minimized by the above-described automation; increasing efficiency and/or accuracy. Fourth, database centralization can be developed, which allows more efficient, complex, and/or accurate prediction/analysis to be performed against the centralized data. Fifth, safety incident trends can be identified and a potential safety incident mapped to a corresponding avoidance/mitigation process. Sixth, future safety trends can be projected which can improve safety policy. Seventh, a proactive alerting mechanism can allow development of mitigating controls, plans, and/or countermeasures to improve Safety KPI and safety records (e.g., a particular department with a projected low future Safety KPI can benefit from the proactive alerting mechanism). Eighth, Safety KPI information can be overseen on a corporate scale and improve Safety KPI efficacy and accuracy by using corporate information such as HR, medical, and/or safety records for safety policy compliance. Note that the subject matter described herein is done so in the context of an oil and gas operational model and at a corporate level, but, as will be aware to those of ordinary skill in the art, the described subject matter can be used and/or extended to support any level of industry/endeavor cognizant of safety policy compliance and/or analysis of historical safety (or other types of) incidents and where appropriate computing systems and communications are available.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIG. 1 is a block diagram of an example automated Safety KPI system 100 according to an implementation.

FIG. 2A illustrates an example formula for calculating a Safety KPI according to an implementation.

FIGS. 2B-2E illustrate example uses of the described formula of FIG. 2A according to an implementation.

Like reference numbers and designations in the various drawings indicate like elements.

DETAILED DESCRIPTION

Figure 3:
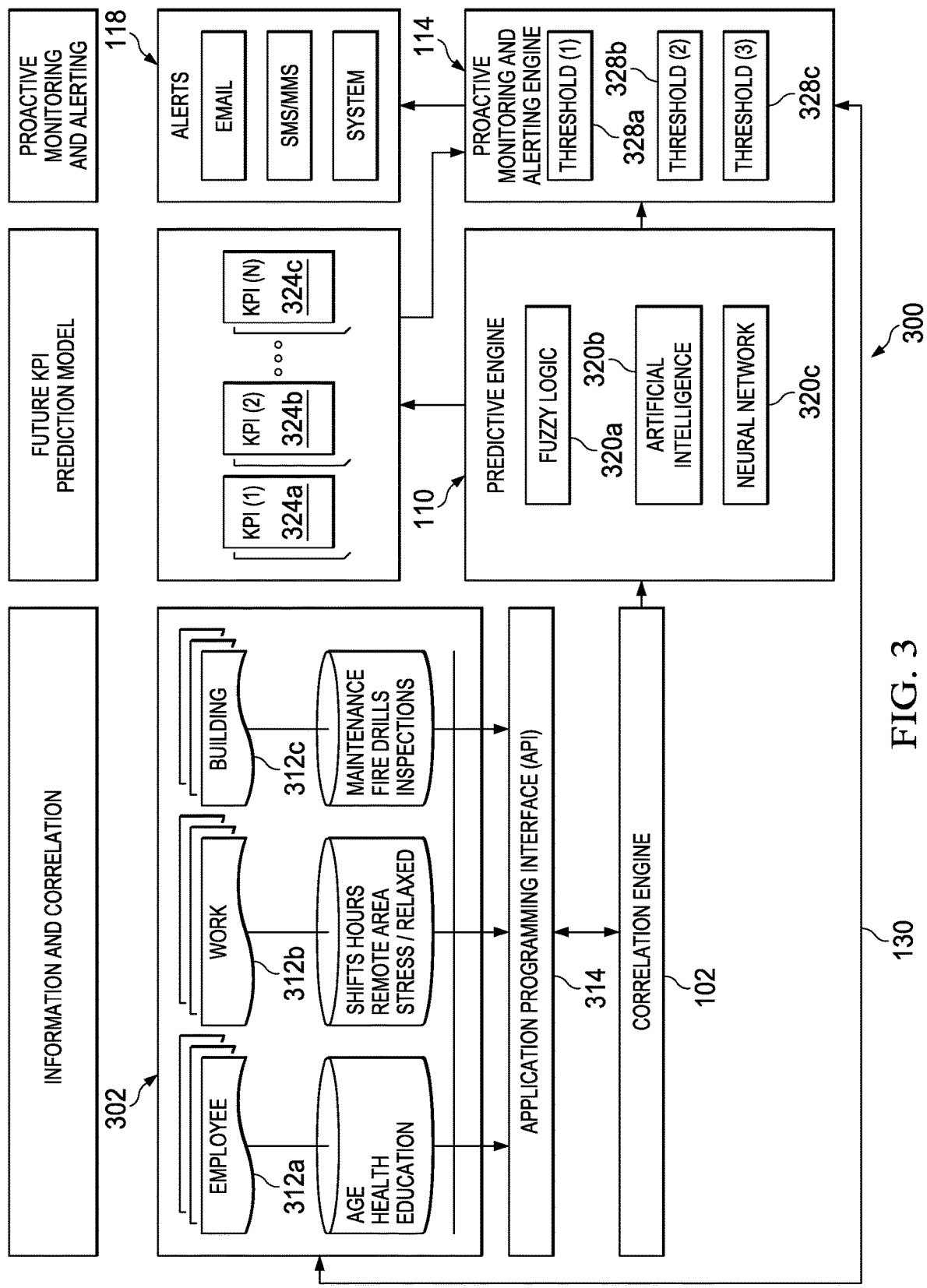
FIG. 3 is a lower-level block diagram of the example automated Safety KPI system of FIG. 1 according to an implementation.

This disclosure generally describes computer-implemented methods, computer-program products, and computer systems for proactive Safety KPI analysis.

The following detailed description is presented to enable any person skilled in the art to make, use, and/or practice the disclosed subject matter and is provided in the context of one or more particular implementations. Various modifications to the disclosed implementations will be readily apparent to those skilled in the art, and the general principles defined herein may be applied to other implementations and applications without departing from the scope of the disclosure. Thus, the present disclosure is not intended to be limited to the described and/or illustrated implementations but is to be accorded the widest scope consistent with the principles and features disclosed herein.

Key Performance Indicators (KPIs) are widely used in the process industry to improve efficiency. For example, a Safety KPI can be data (e.g., number of accidents, equipment failure, and other data) used as a metric to evaluate safety policy compliance, determine a safety performance status, provide trend analysis and predictive functionality for safety trends, and/or assist with developing a safety remediation/improvement plan.

The root cause of a safety incident can typically vary depending on, for example, the technology being utilized, the processes adopted, and the skilled workforce involved in the operation. In addition, the ability to understand and identify a root cause for a safety incident can help to predict/anticipate the safety incident, enabling development of plans that can reduce or eliminate impacts of safety incidents. In this manner, the disclosed subject matter can be used to automatically identify current and potential safety concerns and provide appropriate and informative alerts to proactively mitigate these concerns.

In a typical implementation of Safety KPIs, each department in a given entity (e.g., a corporation or company) performs a periodic survey on its own safety performance. A survey can be evaluated to gauge where each department currently stands in terms of safety performance. Furthermore, a survey can compare each department's current safety record with an historical safety record. The collection and analysis of safety surveys is also typically a inaccurate, subjective, and/or time-consuming process performed by a few individuals.

However, a survey-based Safety KPI analysis does not always incorporate all potentially relevant data (that which can be used as Safety KPI data) available within an organization, such as HR, medical, and/or safety records. As previously stated, the manual analysis of the Safety KPI data can be inaccurate, subjective, and/or time-consuming. Furthermore, while the manual analysis can determine historical trends, it is difficult to predict potential safety incidents and suggest possible preventative action. The safety data collected is also only as recent as the last survey, and thus results from a manual analysis may not accurately reflect an actual current safety status; in some cases the actual safety status can be very different than what the prior collected data indicates.

At a high level, this disclosure is drawn to automatically analyzing data to improve Safety KPIs, including providing proactive alerts for potential human safety incidents to mitigate potential occurrence of the human safety events. The disclosure discusses automated Safety KPI computer-implemented methods, computer-program products, and computer systems that have the ability to read information from different sources, make an intelligent correlation, and generate predictions for the purpose of proactive alerting, mitigation, and continuously improving the effectiveness of Safety KPIs. The automated collection and analysis process for Safety KPI data can be automated so that Safety KPI model(s) can be proactively enhanced and optimized.

Information and records can be collected from many sources. For example, corporate databases and corporate records can be communicated with to gather relevant information. In some cases, an application API can be used to interface with these and other information sources.

The detailed description describes functionality typically executed at an overall corporate level using corporate information (e.g., historical safety incidents, etc.), departmental level information (e.g., plant operations, building safety records, equipment maintenance records, asset integrity, environmental issues, etc.), and/or individual level information (e.g., medical records, training records, accidents/personal injuries, traffic violations, health issues, etc.).

FIG. 1 is a block diagram of an example automated Safety KPI system 100 according to an implementation. In a typical implementation, system 100 includes a Correlation Engine 102, a Predictive Engine 110, a Monitoring and Alerting Engine ("MA Engine") 114, a database 112, Incident Repository database 116, and one or more models (e.g., Work Dynamics model 104, Statistical and Reporting model 106, and/or Employee Behavioral model 108) communicably coupled with, for example, a network 130. Although only one component connecting arrow is labeled with a network 130 label, other connections in FIG. 1 can also be considered to be part of network 130 or one or more other networks communicably coupled to network 130.

In typical implementations, the automated Safety KPI system 100 can be implemented, for example, using one or more computers/computing systems such as described below in FIG. 4. In some implementations, one or more of the described components of the automated Safety KPI system 100 can be stand-alone components. For example, the engines 102, 110, 114 can be separate modules (e.g., computing hardware and/or software) in a computing system. In some implementations, two or more of the described components can be incorporated into a single component of the system 100. For example, the engines 102, 110, 114 can be sub-modules of another controlling module. Other implementations and configurations can be implemented without departing from the scope of this disclosure.

At a high-level, the disclosed computer-implemented methods, computer-program products, and computer systems typically input collected multi-source information (e.g., information from database 112, Incident Repository database 116, and one or more above-mentioned models) into a Correlation Engine 102 that analyzes the information and generates correlations between the collected information and safety incidents. The Correlation Engine 102 inputs its generated correlations into a Predictive Engine 110 configured to use the correlations to predict potential safety concerns. The Predictive Engine 110 inputs predictions into a Monitoring and Alerting Engine 114 that periodically or continuously monitors both current safety parameters and predictions from the Predictive Engine 110. Under certain conditions, the Monitoring and Alert Engine 114 can deliver alerts and notifications to appropriate parties (e.g., if a current safety parameter (e.g., a Safety KPI or other parameter) crosses a certain threshold)).

Turning to FIGS. 2A-2E, FIG. 2A illustrates an example formula 200a for calculating an example Safety KPI according to an implementation. In the described implementation, the example Safety KPI is calculated by subtracting the total sum of safety deviation factors (the first term in the brackets) and adding the total sum of remediation factors (the second term in the brackets). Thus, in this example, a greater value of the Safety KPI corresponds to a better safety performance. In some implementations, each safety deviation (d) can be assigned a severity of deviation factor ($\alpha$). The illustrated formula 200a for calculating the example Safety KPI is meant for illustrative purposes and to assist with understanding of the described concepts. It will be clear to those of ordinary skill in the art that various other methods of calculating the illustrated Safety KPI are possible. The illustrated formula 200a is not to be limiting and other methods of calculating Safety (and other types of) KPIs consistent with this disclosure are considered to be within the scope of the disclosure.

FIGS. 2B-2E illustrate tables 200b-200e demonstrating example uses of the described formula of FIG. 2A according to an implementation. For example, FIG. 2B illustrates an example table 200b with data used to determine a severity of deviation factor based on potential monetary loss. For example, a relatively minor safety deviation 202b may have a potential loss of less than $1M, and so would be assigned a severity factor of 1. In contrast, a relatively severe safety deviation 204b may have a potential loss of greater than $10M and so would be assigned a severity factor of 10.

Additionally, each remediation plan (r) (e.g., associated with mitigating/eliminating potential loss as identified in table 200b) can be assigned a remediation factor ($\beta$). A remediation factor can be based on the cost, the time, and/or the implementation difficulty of the respective remediation plan. For example, the remediation factor can be the sum of individual factors for the cost, the time, and the difficulty.

FIG. 2C illustrates an example table 200c with data used to determine a cost factor for a remediation plan. For example, a relatively inexpensive remediation plan 202c costing less than $1M would be assigned a cost factor of 0.3. In contract, a relatively expensive remediation plan 204c costing $10M would be assigned a cost factor of 1.

Note that factors can be determined for time, difficulty, and other values in a similar manner as in table 200c. For example, FIG. 2D illustrates an example table 200d with data used to determine a time factor for a remediation plan. A shorter estimated time (e.g., 202d) to implement the plan is assigned a smaller number, and a longer estimated time (e.g., 204d) is assigned a larger number. Similarly, FIG. 2E illustrates an example table 200e with data used to determine a difficulty factor for a remediation plan. A remediation plan that is easier to implement (e.g., 202e) is assigned a smaller number, and a plan that is more difficult to implement (e.g., 204e) is assigned a larger number. In this manner, safety deviations and safety remediation plans can be systematically incorporated into a Safety KPI calculation.

Turning to FIG. 3, FIG. 3 is a low-level block diagram 300 of the example automated Safety KPI system 100 of FIG. 1 according to an implementation.

Correlation Engine

In typical implementations, the Correlation Engine 102 is configured to provide a back-end interface to historical information resources and to correlate data collected from the historical information resources. Typically, the Correlation Engine 102 is a sub-system within the automated Safety KPI system 100 that can compare/correlate information to determine how a change in one parameter, status, or situation can affect safety-related issues. For example, the Correlation Engine 102 could correlate information such as a distance an employee travels to his place of employment and transportation-related accidents. As another example, the Correlation Engine 102 could correlate information such as an employee taking a medication that causes drowsiness and that employee falling down/asleep and causing a safety incident. In another example, the Correlation Engine 102 can correlate information such as a piece-of-equipment's preventative maintenance schedule and the failure of the equipment. In some cases, the Correlation Engine 102 can correlate historical safety incidents with corresponding causes. As will apparent to those of ordinary skill in the art, apart from the provided example correlations, many other possible correlations can be generated and/or identified. In this manner, the Correlation Engine 102 can quantitatively identify how a change in one factor can influence one or more safety-related factors. For example, the Correlation Engine 102 can correlate information to changes in one or more Safety KPIs. After processing and correlating information, the Correlation Engine 102 feeds its outputs to the Predictive Engine 110 (described below).

The example Correlation Engine 102 shown in FIG. 3 interfaces (e.g., using network 130) with example categories 302 (containing one or more categories, e.g., categories 312a-312c) of information that can be correlated and analyzed. For example, the "Employee" category (312a) can map to "Employee Behavioral Model" (FIG. 1, 108), the "Work" Category (312b) can map to the "Work Dynamics Model" (FIG. 1, 104), and the "Building" category (312c) can map to "Statistical and Reporting" Model (FIG. 1, 106). In some implementations, the categories 302 can be stored in database 112 of FIG. 1 and/or in one or more other databases/data structures. Although only one component connecting arrow in FIG. 3 is labeled with a network 130 label, other connections in FIG. 3 can also be considered to be part of network 130 (consistent, e.g., with FIG. 1) or one or more other networks communicably coupled to network 130. The Correlation Engine 102 can also interface with an Incident Repository database 116 (not illustrated in FIG. 3—refer to FIG. 1) that contains information including that related to historical safety incidents. The Correlation Engine 102 can interface with categories 302 (e.g., stored in one or more of database 112, the Incident Repository database 116 of FIG. 1, and/or other databases/data structures) using one or more appropriate interfacing software or Application Programming Interfaces (APIs) 314 for fetching and retrieving records and information. In implementations where the categories 302 are stored in a database(s), in some cases, the storage database(s) includes multiple sub-databases storing data for each of categories 312a-c. The multiple sub-databases can be of different types, have different structures, and/or sources, and the Correlation Engine 102 can have appropriate APIs (e.g., API 314) for interfacing with each sub-database. The categories 302 can also contain information from different sources. For example, the category 312a can contain employee information, such as age, medical records, health conditions, corporate human resources records, education level, training history, and/or other information. The example category 312*b* contains work-related information, such as shifts or hours associated with work positions, stress associated with work positions, work locations, travel data, transportation data, weather conditions, and/or other information. The example category 312*c* contains building-related information, such as building maintenance records, equipment maintenance records, safety drill records, inspection records, and/or other information. As will be apparent to those of ordinary skill in the art, other categories, storage methods, and/or types of information consistent with this disclosure can be made available and used by the example automated Safety KPI system 100.

The Incident Repository database 116 (not illustrated in FIG. 3) can extract incident information from other tracking systems databases such as Enterprise Resource Planning (ERP), Maintenance, Safety Reporting System, Health, and other tracking system databases. The Incident Repository database 116 can also store information that is manually entered by individuals. For example, an individual can enter detailed information into the Incident Repository database 116 regarding a safety incident. As another example, the Incident Repository database 116 can contain information collected from surveys or questionnaires. In some cases, the information stored in the Incident Repository database 116 includes historical incident occurrences and corresponding measures/actions that were taken based on the incident occurrences. In some implementations, the Incident Repository database 116 stores relevant information that does not fit within existing database 112. In some implementations, the Incident Repository database 116 can be incorporated within and as a part of database 112 and/or the correlation engine 102.

The Correlation Engine 102 can also be configured to identify deviations between current data and historical data and feed information related to these deviations to the Predictive Engine 110. The Correlation Engine 102 can feed these deviations directly or process the deviations before sending them to the Predictive Engine 110. For example, the deviations can be used to determine a change in one or more Safety KPIs or other factors.

The Correlation Engine 102 can also generate correlations between the above-described category 302 information and recorded safety incidents. For example, based on the collected information, the Correlation Engine 102 can generate a correlation between employee training for a piece of equipment and safety incidents related to that piece of equipment. As another example, the Correlation Engine 102 can generate a correlation between certain parameters and a negative change in the Safety KPI for an element (e.g., a department) of an entity (e.g., a corporation). As will be apparent to those of ordinary skill in the art, these are simply illustrative examples; other correlations, situations, information, and/or parameters consistent with this disclosure are also possible.

In some implementations, the Correlation Engine 102 interfaces with one or more models (e.g., illustrated in FIG. 1) to generate correlations. The models can, for example, describe how certain factors affect safety issues and can include equations, formulas, tables, algorithms, and/or other features or techniques. In some cases, a model can be a subcomponent of the Correlation Engine 102. For example, the automated Safety KPI system 100 illustrated in FIG. 1 includes the above-mentioned Work Dynamics model 104, Statistical and Reporting model 106, and the Employee Behavioral model 108 that interface with the Correlation Engine 102. Other implementations can include one or more of these models and/or other models consistent with this disclosure.

As an example, the Work Dynamics model 104 can be configured to model how work environments affect safety issues. For example, the Work Dynamics model 104 can include one or more models related to employee commutes, machinery and/or equipment that employees use, employee stress for particular environments, the relation of particular jobs, tasks, or locations to employee health or performance, and/or other models related to work dynamics.

The Statistical and Reporting model 106 can be configured to use one or more statistical analysis models. For example, the Statistical and Reporting model 106 can use information (e.g., from database 112 and/or Incident Repository database 116) to generate statistical reports. For example, the Statistical and Reporting model 106 can provide data to determine probabilities of safety incidents, characterize time intervals between incidents, and otherwise generate statistical safety data.

The Employee Behavioral model 108 can be configured to model employee behavior. For example, the Employee Behavioral Model 108 can include models related to employee health (e.g., blood pressure, drowsiness, illness, etc.), employee jobs, employee age, hours worked, medicines, or other factors.

Predictive Engine

The Predictive Engine 110 is configured to receive outputs from the Correlation Engine 102 and, based on the outputs, generate predictions related to safety incidents, future safety trends, and future Safety KPIs. In some cases, the Predictive Engine 110 can predict safety incident or safety trends over a duration of time (e.g., years, months, weeks, and/or other duration of time) based on the current status of safety parameters. The Predictive Engine 110 can also predict the type of safety incident, probable direct or indirect causes, and possible measures to avoid it. In some cases, the Predictive Engine 110 is a self-learning engine and becomes more accurate as it learns from more information, experience, etc. and thus can continuously improve workplace safety.

For example, the Predictive Engine 110 can predict safety incidents, Safety KPIs, safety trends, and/or other safety concerns based on current safety parameters or other information. The Predictive Engine 110 can predict the potential safety concerns over a future time frame (e.g., years, months, weeks, and/or other future time frame). As an example, the Predictive Engine 110 can predict that a safety incident will occur within a timeframe based on current safety parameters. For example, the Predictive Engine 110 can predict that a piece of equipment will fail within the next few months based on the current preventative maintenance data for that equipment. As another example, the Predictive Engine 110 can predict safety incidents or trends related to individuals, such as personal injuries (e.g., for individuals, groups, departments, jobs, etc.), traffic violations, changes in employee health, etc. As another example, the Predictive Engine 110 can predict safety incidents or trends related to the workplace or organization, such as building safety issues, asset integrity, environmental issues, damage, loss, etc. The Predictive Engine 110 can also provide additional information about predicted safety concerns, such as potential causes of a safety concern and measures that could be taken to avoid occurrence of the safety concern.

The Predictive Engine 110 can generate a prediction using one or more techniques such as the use of a neural network, fuzzy logic, probability logic, an artificial intelligence engine, an algorithm, and/or another technique. The Predictive Engine 110 can also include one or more modules 320a-c to generate a prediction. For example, the Predictive Engine 110 can generate a prediction using a Fuzzy Logic module 320a, an Artificial Intelligence module 320b, and/or a Neural Network module 320c. In other implementations, the Predictive Engine 110 can include more or less modules or techniques than illustrated. In some cases, one or more of the modules 320a-c can be incorporated within the Predictive Engine 110 or within another module.

The Predictive Engine 110 can generate/update one or more Safety KPI Prediction Models 324a-c. The Safety KPI Prediction Models 324a-c can be used to predict Safety KPI values or trends for an upcoming duration of time. As will be apparent to those of ordinary skill in the art, the Predictive Engine 110 can generate more or less Safety KPI Prediction Models than those shown in FIG. 3. In some cases, a Safety KPI Prediction Model can include a Safety KPI calculation formula such as that shown in FIGS. 2a-e or other Safety KPI calculation formula particular to a type of Safety KPI, etc. Each Safety KPI Prediction Model 324a-c can be associated with a discrete entity or set of discrete entities such as an employee or group of employees, one or more buildings, a corporation, a task or set of tasks, or others. For example, a first Safety KPI Prediction Model 324a can predict future Safety KPI values for an entire workforce of an entity (e.g., a corporation), a second Safety KPI Prediction Model 324b can predict future Safety KPI values for a department within the corporation, and a third Safety KPI Prediction Model 324c can predict future Safety KPI values for a floor of a building associated with the corporation that contains certain types of equipment. As will be apparent to those of ordinary skill in the art, other Safety KPI Prediction Models and associations are possible in other implementations. In some implementations, the Predictive Engine 110 can continuously or periodically update an existing Safety KPI Prediction Model.

Proactive Monitoring & Alerting Engine

The Monitoring and Alerting Engine 114 ("MA Engine 114") receives predictions from the Predictive Engine 110 and/or Safety KPI Prediction Models 324a-c. Based on these predictions, the MA Engine 114 can send one or more alerts 118 to one or more appropriate individuals. In some cases, the MA Engine 114 provides safety reports, such as graphical displays, graphical dashboards, tables, or other types of reports. A safety report can describe, for example, current or historical Safety KPIs and potential safety concerns for the corporation, one or more departments, one or more individuals, and/or others.

The MA Engine 114 can continuously monitor information such as Safety KPIs or predictions (e.g., predicted Safety KPIs) and compare the information against one or more Alert Thresholds 328a-c. For example, the MA Engine 114 can receive a predicted Safety KPI value, and if the predicted value is less than a defined Alert Threshold, send an alert 118 to individuals associated with the particular Safety KPI. The Alert Thresholds 328a-c can be defined for individuals, groups, buildings, and/or other entities including those previously described. The Alert Thresholds 328a-c can be fixed or dynamic values. For example, the Alert Thresholds 328a-c can change/be changed based on current information obtained from the database 112 and/or predictions from Predictive Engine 110.

The MA Engine 114 can also send an alert 118 based on other types of predictions. For example, the Predictive Engine 110 can predict a safety incident (e.g., an injury, a traffic accident, an equipment malfunction, and/or other type of incident) and/or a safety concern, and the MA Engine 114 can send an alert 118 to appropriate individuals. In some implementations, the MA Engine 114 initiates transmission of (passes an alert 118 to a separate engine that can send) the alert to appropriate individuals.

In some cases, the MA Engine 114 receives (or pulls) current information from the database 112 and/or Incident Reporting Database 116 and compares the current information with one or more Alert Thresholds 328a-c. The MA Engine 114 can send an alert 118, for example, if the current information is greater than or less than an associated Alert Threshold. The MA Engine 114 can also send information to be stored within database 112 or Incident Reporting database 116. For example, database 112 can maintain information related to instances in which Thresholds 328a-c are crossed.

An alert 118 can describe the predicted safety issue and suggest procedures and/or a plan to mitigate the concern. An alert 118 can also describe the underlying cause of the safety issue. An alert 118 can be reported via channels such as e-mail, SMS/MMS, telephone, loudspeaker, electronic dashboard, or another system or technique. As an illustrative example, an alert could report a prediction that a Safety KPI related to truck delivery will potentially drop below a certain threshold in the next year, and the alert could also suggest that truck drivers take safety training courses to reduce the possibility of the low Safety KPI.

Figure 4:
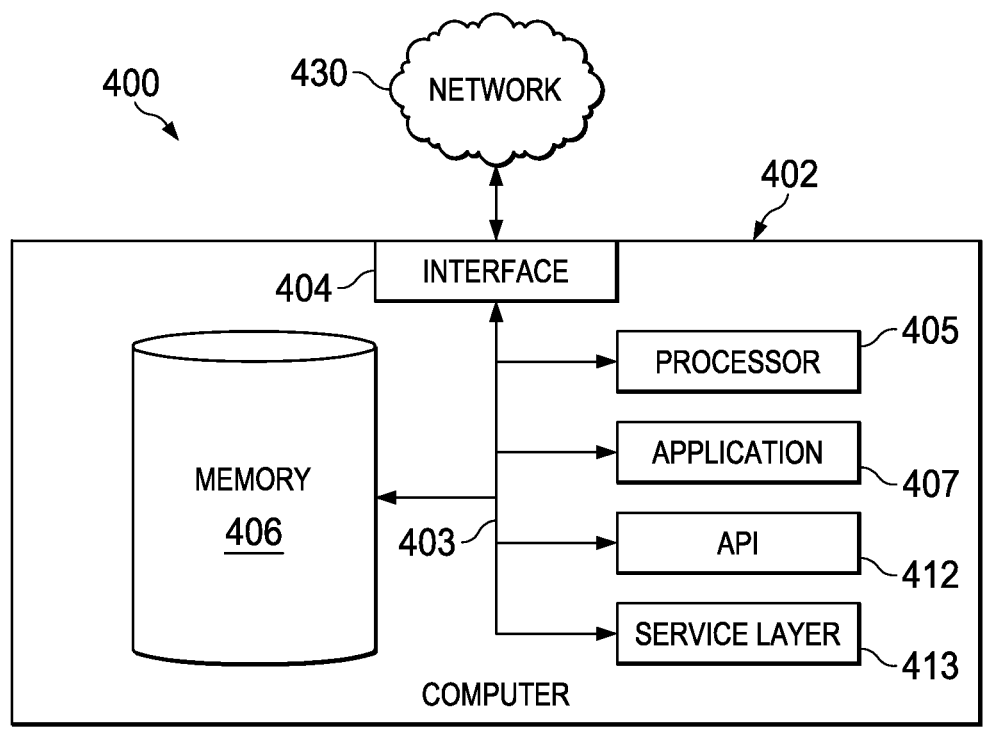
FIG. 4 is a block diagram of an exemplary computer used in the Safety KPI system according to an implementation.

FIG. 4 is a block diagram 400 of an exemplary computer 402 used in the Safety KPI system 100 according to an implementation. The illustrated computer 402 is intended to encompass any computing device such as a server, desktop computer, laptop/notebook computer, wireless data port, smart phone, personal data assistant (PDA), tablet computing device, one or more processors within these devices, or any other suitable processing device, including both physical and/or virtual instances of the computing device. Additionally, the computer 402 may comprise a computer that includes an input device, such as a keypad, keyboard, touch screen, or other device that can accept user information, and an output device that conveys information associated with the operation of the computer 402, including digital data, visual and/or audio information, or a GUI.

The computer 402 can serve as a client, network component, a server, a database or other persistency, and/or any other component of the Safety KPI system 100. The illustrated computer 402 is communicably coupled with a network 430 (e.g., network 130 of FIGS. 1 and 3). In some implementations, one or more components of the computer 402 may be configured to operate within a cloud-computing-based environment.

At a high level, the computer 402 is an electronic computing device operable to receive, transmit, process, store, or manage data and information associated with the Safety KPI system 100. In some implementations, the computer 402 may also include or be communicably coupled with an application server, e-mail server, web server, caching server, streaming data server, business intelligence (BI) server, and/or other server.

The computer 402 can receive requests over network 430 from a client application (e.g., executing on another computer 402) and responding to the received requests by processing the said requests in an appropriate software application. In addition, requests may also be sent to the computer 402 from internal users (e.g., from a command console or by other appropriate access method), external or third-parties, other automated applications, as well as any other appropriate entities, individuals, systems, or computers.

Each of the components of the computer 402 can communicate using a system bus 403. In some implementations, any and/or all the components of the computer 402, both hardware and/or software, may interface with each other and/or the interface 404 over the system bus 403 using an application programming interface (API) 412 and/or a service layer 413. The API 412 may include specifications for routines, data structures, and object classes. The API 412 may be either computer-language dependent/independent and refer to a complete interface, a single function, or even a set of APIs. The service layer 413 provides software services to the computer 402 and/or the Safety KPI system 100. The functionality of the computer 402 may be accessible for all service consumers using this service layer. Software services, such as those provided by the service layer 413, provide reusable, defined business functionalities through a defined interface. For example, the interface may be software written in JAVA, C++, or other suitable language providing data in extensible markup language (XML) format or other suitable format. While illustrated as an integrated component of the computer 402, alternative implementations may illustrate the API 412 and/or the service layer 413 as stand-alone components in relation to other components of the computer 402 and/or Safety KPI system 100. Moreover, any or all parts of the API 412 and/or the service layer 413 may be implemented as child or sub-modules of another software module, enterprise application, or hardware module without departing from the scope of this disclosure.

The computer 402 includes an interface 404. Although illustrated as a single interface 404 in FIG. 4, two or more interfaces 404 may be used according to particular needs, desires, or particular implementations of the computer 402 and/or Safety KPI system 100. The interface 404 is used by the computer 402 for communicating with other systems in a distributed environment—including within the Safety KPI system 100—connected to the network 430 (whether illustrated or not). Generally, the interface 404 comprises logic encoded in software and/or hardware in a suitable combination and operable to communicate with the network 430. More specifically, the interface 404 may comprise software supporting one or more communication protocols associated with communications such that the network 430 or interface's hardware is operable to communicate physical signals within and outside of the illustrated Safety KPI system 100.

The computer 402 includes a processor 405. Although illustrated as a single processor 405 in FIG. 4, two or more processors may be used according to particular needs, desires, or particular implementations of the computer 402 and/or the Safety KPI system 100. Generally, the processor 405 executes instructions and manipulates data to perform the operations of the computer 402. Specifically, the processor 405 executes the functionality for creating/operating a Safety KPI system.

The computer 402 also includes a memory 406 that holds data for the computer 402 and/or other components of the Safety KPI system 100. Although illustrated as a single memory 406 in FIG. 4, two or more memories may be used according to particular needs, desires, or particular implementations of the computer 402 and/or the Safety KPI system 100. While memory 406 is illustrated as an integral component of the computer 402, in alternative implementations, memory 406 can be external to the computer 402 and/or the Safety KPI system 100.

The application 407 is an algorithmic software engine providing functionality according to particular needs, desires, or particular implementations of the computer 402, particularly with respect to functionality required for creating a Safety KPI system. For example, application 407 can serve as one or more components, modules, applications, etc. described with respect to FIGS. 1-3. Further, although illustrated as a single application 407, the application 407 may be implemented as multiple applications 407 on the computer 402. In addition, although illustrated as integral to the computer 402, in alternative implementations, the application 407 can be external to the computer 402 and/or the Safety KPI system 100.

There may be any number of computers 402 associated with, or external to, the Safety KPI system 100 and communicating over network 430. Further, the term "client," "user," and other appropriate terminology may be used interchangeably as appropriate without departing from the scope of this disclosure. Moreover, this disclosure contemplates that many users may use one computer 402, or that one user may use multiple computers 402.

Figure 5:
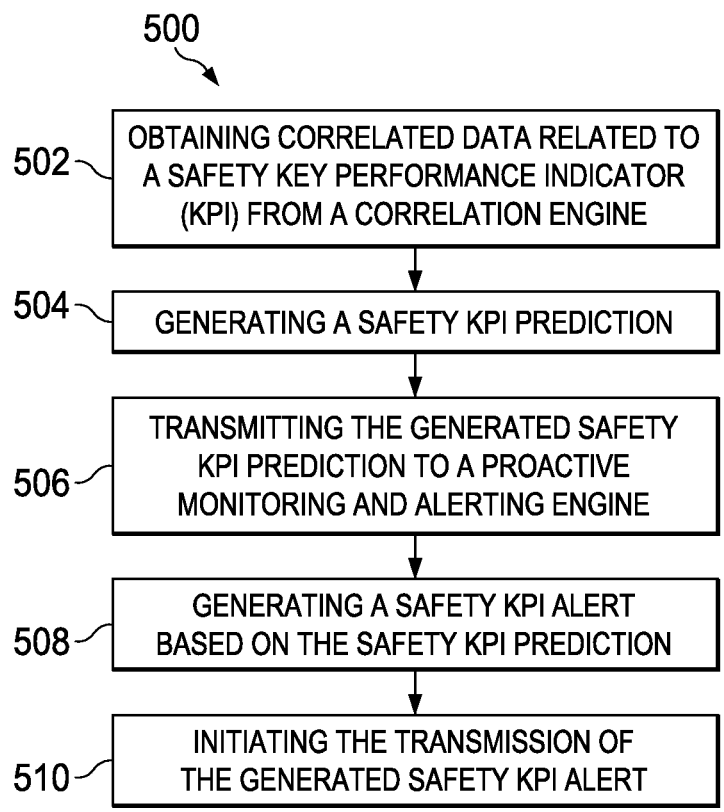
FIG. 5 is a block diagram of a method for automating a proactive Safety KPI analysis according to an implementation.

FIG. 5 is a block diagram of a method for automating a proactive Safety KPI analysis according to an implementation. For clarity of presentation, the description that follows generally describes method 500 in the context of FIGS. 1, 2A-2E, and 3-4. However, it will be understood that method 500 may be performed, for example, by any other suitable system, environment, software, and hardware, or a combination of systems, environments, software, and hardware as appropriate. In some implementations, various steps of method 500 can be run in parallel, in combination, in loops, or in any order.

At 502, correlated data related to a safety key performance indicator (KPI) is obtained from a correlation engine. In some implementations, the correlation engine is communicably coupled with at least one database and at least one correlation model selected from the group consisting of a Work Dynamics model, a Statistical and Reporting model, and an Employee Behavioral model. From 502, method 500 proceeds to 504.

At 504, a safety KPI prediction related to safety incidents, future safety trends, or future safety KPIs is generated based on the received correlated data and at least one safety KPI prediction model. In some implementations, the generation is performed by at least one of a prediction engine selected from the group consisting of a neural network, fuzzy logic, probability logic, and an artificial intelligence engine. In some implementations, the prediction engine is self-learning. In some implementations, the at least one safety KPI prediction model is generated or updated by the at least one prediction engine based on the received correlated data, the at least one safety KPI prediction model used by the proactive monitoring and alerting engine to generate the safety KPI alerts. From 504, method 500 proceeds to 506.

At 506, the generated safety KPI prediction is transmitted to a proactive monitoring and alerting engine. In some implementations, the proactive monitoring and alerting engine receives data from the at least one safety KPI prediction model. From 506, method 500 proceeds to 508.

At 508, a safety KPI alert is generated based on the safety KPI prediction, at least one alert threshold, and the at least one safety KPI prediction model. From 508, method 500 proceeds to 510.

At 510, transmission of the generated safety KPI alert is initiated. After 510, method 500 stops.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus," "computer," or "electronic computer device" (or equivalent as understood by one of ordinary skill in the art) refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and parallel processing may be advantageous.

Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

What is claimed is:

1. A computer-implemented method executed by one or more processors, the method comprising:

obtaining, by the one or more processors, an operational status of machinery and employee information of persons operating the machinery, wherein the employee information comprises medical records, health conditions, corporate human resources records, education level, and training history of persons operating the machinery;

obtaining, by the one or more processors, correlated data related to a safety key performance indicator (KPI) of the machinery from a correlation engine, wherein the correlated data comprises a correlation of the operational status of machinery with one or more potential safety incidents and a correlation of the employee information with one or more potential safety incidents, the correlation correlating machinery use to discrete entities including specific employees and groups of employees, including correlating a distance of travel to a place of employment by an employee and transportation-related accidents;

determining, by the one or more processors, deviations between current operational status data and historical operational status data to identify one or more safety deviation factors;

generating, by the one or more processors, a safety KPI prediction related to the one or more potential safety incidents, future safety trends, or future safety KPIs based on the correlated data and at least one safety KPI prediction model, wherein the safety KPI prediction is generated based on the one or more safety deviation factors and one or more remediation factors given the operational status of machinery;

transmitting, by the one or more processors, the generated safety KPI prediction to a proactive monitoring and alerting engine;

generating, by the one or more processors, a safety KPI alert based on the safety KPI prediction, at least one alert threshold, and the at least one safety KPI prediction model;

automatically transmitting, by the one or more processors, the generated safety KPI alert; and in response to automatically transmitting, updating, by the one or more processors, a feature or an operational method of the machinery associated with the KPI alert to proactively mitigate the one or more potential safety incidents.

2. The method of claim 1, wherein the correlation engine is communicably coupled with at least one database and at least one correlation model selected from the group consisting of a Work Dynamics model, a Statistical and Reporting model, and an Employee Behavioral model, wherein:
the Work Dynamics model comprises one or more models related to employee commutes or machinery that employees use; and
the Employee Behavioral model comprises one or more models related to employee health, employee jobs, employee age, hours worked, or medicines.

3. The method of claim 2, wherein the proactive monitoring and alerting engine can update an internal alert threshold based on data from the at least one database and the at least one correlation model.

4. The method of claim 1, wherein the generation is performed by at least one of a prediction engine selected from the group consisting of a neural network, fuzzy logic, probability logic, and an artificial intelligence engine.

5. The method of claim 4, wherein the prediction engine is self-learning.

6. The method of claim 4, wherein the at least one safety KPI prediction model is generated or updated by the at least one prediction engine based on the correlated data, the at least one safety KPI prediction model used by the proactive monitoring and alerting engine to generate the safety KPI alerts.

7. The method of claim 6, wherein the proactive monitoring and alerting engine receives data from the at least one safety KPI prediction model.

8. A non-transitory, computer-readable medium storing computer-readable instructions, the instructions executable by a computer and configured to:
obtain an operational status of machinery and employee information of persons operating the machinery, wherein the employee information comprises medical records, health conditions, corporate records, education level, and training history human resource of persons operating the machinery;
obtain correlated data related to a safety key performance indicator (KPI) of the machinery from a correlation engine, wherein the correlated data comprises a correlation of the operational status of machinery with one or more potential safety incidents and a correlation of the employee information with one or more potential safety incidents, the correlation correlating machinery use to discrete entities including specific employees and groups of employees, including correlating a distance of travel to a place of employment by an employee and transportation-related accidents;
determine deviations between current operational status data and historical operational status data to identify one or more safety deviation factors;
generate a safety KPI prediction related to the one or more potential safety incidents, future safety trends, or future safety KPIs based on the correlated data and at least one safety KPI prediction model, wherein the safety KPI prediction is generated based on the one or more safety deviation factors and one or more remediation factors given the operational status of machinery;
transmit the generated safety KPI prediction to a proactive monitoring and alerting engine;
generate a safety KPI alert based on the safety KPI prediction, at least one alert threshold, and the at least one safety KPI prediction model;
automatically transmit the generated safety KPI alert; and
in response to automatically transmitting, update a feature or an operational method of the machinery associated with the KPI alert to proactively mitigate the one or more potential safety incidents.

9. The medium of claim 8, wherein the correlation engine is communicably coupled with at least one database and at least one correlation model selected from the group consisting of a Work Dynamics model, a Statistical and Reporting model, and an Employee Behavioral model, wherein:
the Work Dynamics model comprises one or more models related to employee commutes or machinery that employees use; and
the Employee Behavioral model comprises one or more models related to employee health, employee jobs, employee age, hours worked, or medicines.

10. The medium of claim 9, wherein the proactive monitoring and alerting engine can update an internal alert threshold based on data from the at least one database and the at least one correlation model.

11. The medium of claim 8, wherein the generation is performed by at least one of a prediction engine selected from the group consisting of a neural network, fuzzy logic, probability logic, and an artificial intelligence engine.

12. The medium of claim 11, wherein the prediction engine is self-learning.

13. The medium of claim 11, wherein the at least one safety KPI prediction model is generated or updated by the at least one prediction engine based on the correlated data, the at least one safety KPI prediction model used by the proactive monitoring and alerting engine to generate the safety KPI alerts.

14. The medium of claim 13, wherein the proactive monitoring and alerting engine receives data from the at least one safety KPI prediction model.

15. A system, comprising:
a memory;
at least one hardware processor interoperably coupled with the memory and configured to:
obtain an operational status of machinery and employee information of persons operating the machinery, wherein the employee information comprises medical records, health conditions, corporate human resources records, education level, and training history of persons operating the machinery;
obtain correlated data related to a safety key performance indicator (KPI) of the machinery from a correlation engine, wherein the correlated data comprises a correlation of the operational status of machinery with one or more potential safety incidents and a correlation of the employee information with one or more potential safety incidents, the correlation correlating machinery use to discrete entities including specific employees and groups of employees, including correlating a distance of travel to a place of employment by an employee and transportation-related accidents;

determine deviations between current operational status data and historical operational status data to identify one or more safety deviation factors;

generate a safety KPI prediction related to the one or more potential safety incidents, future safety trends, or future safety KPIs based on the correlated data and at least one safety KPI prediction model, wherein the safety KPI prediction is generated based on the one or more safety deviation factors and one or more remediation factors given the operational status of machinery;

transmit the generated safety KPI prediction to a proactive monitoring and alerting engine;

generate a safety KPI alert based on the safety KPI prediction, at least one alert threshold, and the at least one safety KPI prediction model;

automatically transmit the generated safety KPI alert; and in response to automatically transmitting, update a feature or an operational method of the machinery associated with the KPI alert to proactively mitigate the one or more potential safety incident.

16. The system of claim 15, wherein the correlation engine is communicably coupled with at least one database and at least one correlation model selected from the group consisting of a Work Dynamics model, a Statistical and Reporting model, and an Employee Behavioral model, wherein:

the Work Dynamics model comprises one or more models related to employee commutes or machinery that employees use; and the Employee Behavioral model comprises one or more models related to employee health, employee jobs, employee age, hours worked, or medicines.

17. The system of claim 16, wherein the proactive monitoring and alerting engine can update an internal alert threshold based on data from the at least one database and the at least one correlation model.

18. The system of claim 15, wherein the generation is performed by at least one of a prediction engine selected from the group consisting of a neural network, fuzzy logic, probability logic, and an artificial intelligence engine.

19. The system of claim 18, wherein the prediction engine is self-learning.

20. The system of claim 18, wherein the at least one safety KPI prediction model is generated or updated by the at least one prediction engine based on the correlated data, the at least one safety KPI prediction model used by the proactive monitoring and alerting engine to generate the safety KPI alerts.

21. The system of claim 20, wherein the proactive monitoring and alerting engine receives data from the at least one safety KPI prediction model.

* * * * *

UNITED STATES PATENT AND TRADEMARK OFFICE
CERTIFICATE OF CORRECTION

PATENT NO. : 10,572,796 B2  
APPLICATION NO. : 14/705650  
DATED : February 25, 2020  
INVENTOR(S) : AlSaud et al.

Page 1 of 1

It is certified that error appears in the above-identified patent and that said Letters Patent is hereby corrected as shown below:

In the Claims

In Column 17, Line 57, Claim 8, please replace "corporate records," with -- corporate human resources records, --

In Column 17, Line 58, Claim 8, after "history" please delete "human resource"

Signed and Sealed this  
Sixteenth Day of February, 2021

Drew Hirshfeld  
*Performing the Functions and Duties of the*  
*Under Secretary of Commerce for Intellectual Property and*  
*Director of the United States Patent and Trademark Office*